United States Patent
Bagasra

(10) Patent No.: US 10,359,336 B2
(45) Date of Patent: Jul. 23, 2019

(54) LEAK DETECTION IN IRRIGATION SYSTEMS

(71) Applicant: Verizon Patent and Licensing Inc., Arlington, VA (US)

(72) Inventor: Abbas Bagasra, Concord, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 198 days.

(21) Appl. No.: 15/373,730

(22) Filed: Dec. 9, 2016

(65) Prior Publication Data

US 2018/0164179 A1   Jun. 14, 2018

(51) Int. Cl.
*G08B 21/00* (2006.01)
*G01M 3/28* (2006.01)
*B64C 39/02* (2006.01)

(52) U.S. Cl.
CPC ......... *G01M 3/2815* (2013.01); *B64C 39/024* (2013.01); *B64C 2201/12* (2013.01)

(58) Field of Classification Search
CPC .......................... G01M 3/2815; G05D 7/0635
USPC ....................................................... 340/611
See application file for complete search history.

(56) References Cited

U.S. PATENT DOCUMENTS

| | | | | |
|---|---|---|---|---|
| 4,796,466 A | * | 1/1989 | Farmer | F17D 5/02 702/51 |
| 9,470,563 B1 | * | 10/2016 | DeVerse | A61B 5/02 |
| 9,934,671 B1 | * | 4/2018 | Anderson | G08B 21/18 |
| 2005/0246112 A1 | * | 11/2005 | Abhulimen | F17D 5/02 702/51 |
| 2009/0066524 A1 | * | 3/2009 | Yukawa | G01M 3/2815 340/605 |
| 2014/0229124 A1 | * | 8/2014 | Albertao | F17D 5/02 702/47 |
| 2015/0355045 A1 | * | 12/2015 | Solomon | F17D 5/02 702/36 |
| 2016/0202227 A1 | * | 7/2016 | Mathur | G06Q 50/02 702/2 |
| 2016/0252422 A1 | * | 9/2016 | Howitt | E03B 7/071 73/40.5 A |
| 2016/0258834 A1 | * | 9/2016 | Al-Roubaiey | G01M 3/243 |
| 2017/0131174 A1 | * | 5/2017 | Enev | E03B 7/07 |
| 2017/0339852 A1 | * | 11/2017 | Larsen | G05B 15/02 |
| 2018/0141069 A1 | * | 5/2018 | Lemkin | G05D 7/0676 |

* cited by examiner

*Primary Examiner* — Naomi J Small

(57) ABSTRACT

A device can receive, from a set of sensor devices associated with an irrigation system, information that identifies a set of volumetric flow rates. The device can determine a set of pressure loss values based on the set of volumetric flow rates. The device can determine, based on the set of pressure loss values and a first set of moving average pressure loss values, a second set of moving average pressure loss values. The device can determine a subset of sensor devices for which corresponding moving average pressure loss values satisfy a threshold, and determine a subset of locations that correspond to the subset of sensor devices. The device can identify a leak location based on the subset of locations, and provide information that identifies the leak location to permit and/or cause an action to be performed in association with the leak location.

20 Claims, 12 Drawing Sheets

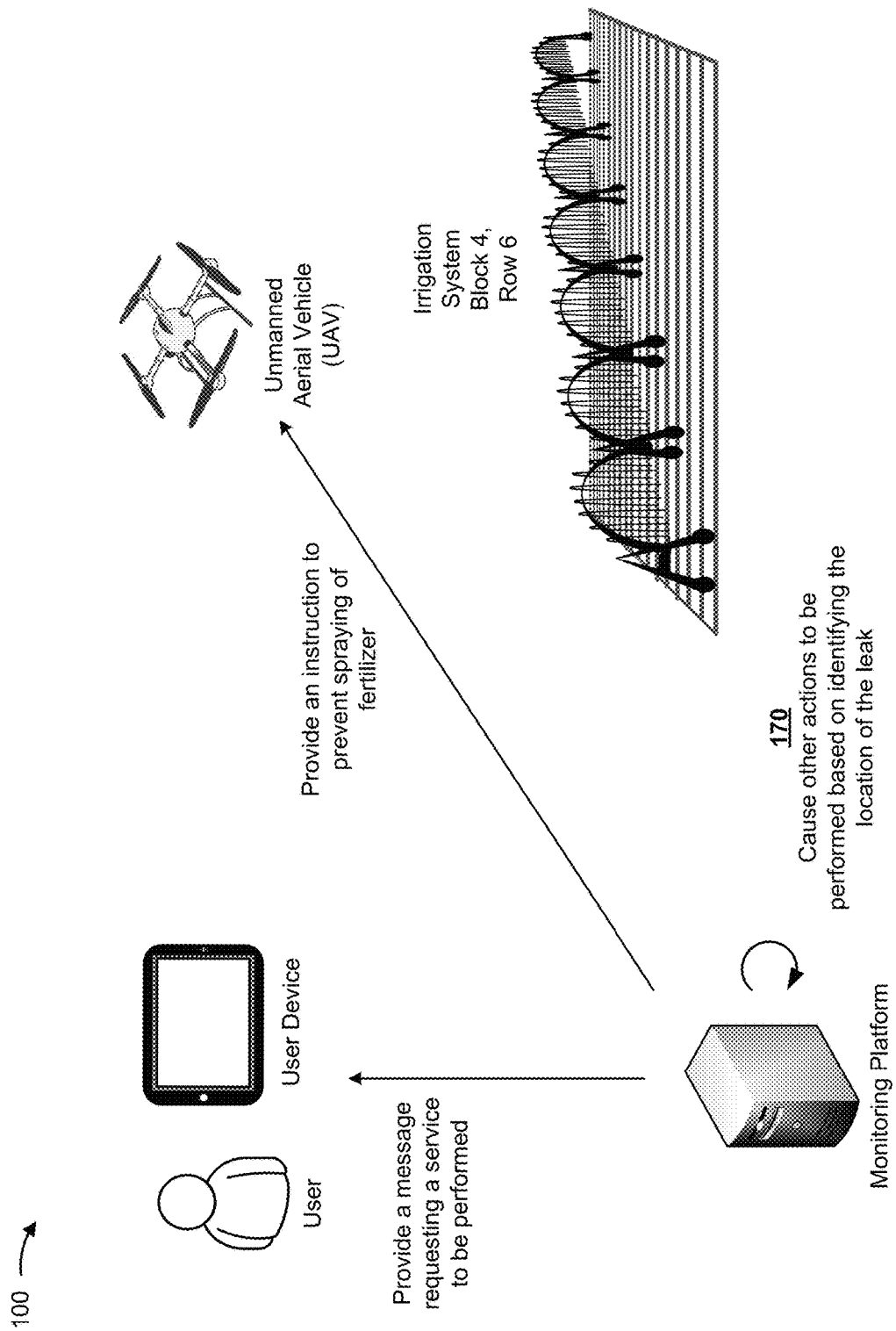

US 10,359,336 B2

LEAK DETECTION IN IRRIGATION SYSTEMS

BACKGROUND

Irrigation is the process in which a controlled amount of water is supplied to crops, plants, etc. at regular intervals for agriculture. An irrigation system can implement a series of pipes, pumps, valves, and/or end-delivery devices (e.g., sprinklers, drip irrigation emitters, etc.) to provide water to particular areas of a field, plot, etc.

BRIEF DESCRIPTION OF THE DRAWINGS

FIGS. 1A-1G are diagrams of an overview of an example implementation described herein;

DETAILED DESCRIPTION OF PREFERRED EMBODIMENTS

The following detailed description of example implementations refers to the accompanying drawings. The same reference numbers in different drawings can identify the same or similar elements.

An irrigation system can implement underground piping that delivers liquid (e.g., water, chemicals, etc.) to various areas of a field for irrigation (e.g., blocks, zones, plots, etc.). In some cases, the underground piping of the irrigation system can develop leaks, which can prevent the appropriate amount of water from being supplied to requisite areas and/or can cause a potentially destructive amount of water to be supplied to an area associated with the leak. Additionally, leaks can incur additional expenses for a farmer based on excess water consumption, can contribute to low crop yield based on under-delivery of water to particular areas, and/or can cause other negative repercussions. Leak detection can be a very time-consuming and/or error prone task for a farmer. As such, the farmer can be unable to localize a leak, thereby resulting in excess expense, inhibited crop yield, or the like.

Implementations described herein enable a monitoring platform (e.g., a cloud computing device) to receive, from sensor devices (e.g., flow meters associated with an irrigation system), information that identifies volumetric flow rates associated with the respective sensor devices. The monitoring platform can implement one or more big data processing techniques to determine moving average pressure loss values for the sensor devices, and to determine a location of a leak based on the moving average pressure loss values (e.g., a location that corresponds to a particular sensor device or a set of sensor devices). In this way, the monitoring platform can continuously monitor data received from hundreds, thousands, etc. of sensor devices, and provide information that identifies a leak and a location of the leak based on the data. In this way, implementations described herein conserve computing device resources that would otherwise be used to attempt to localize a leak (e.g., using inefficient and/or error prone leak detection methods), and improve the accuracy of leak detection.

Figure 1A:
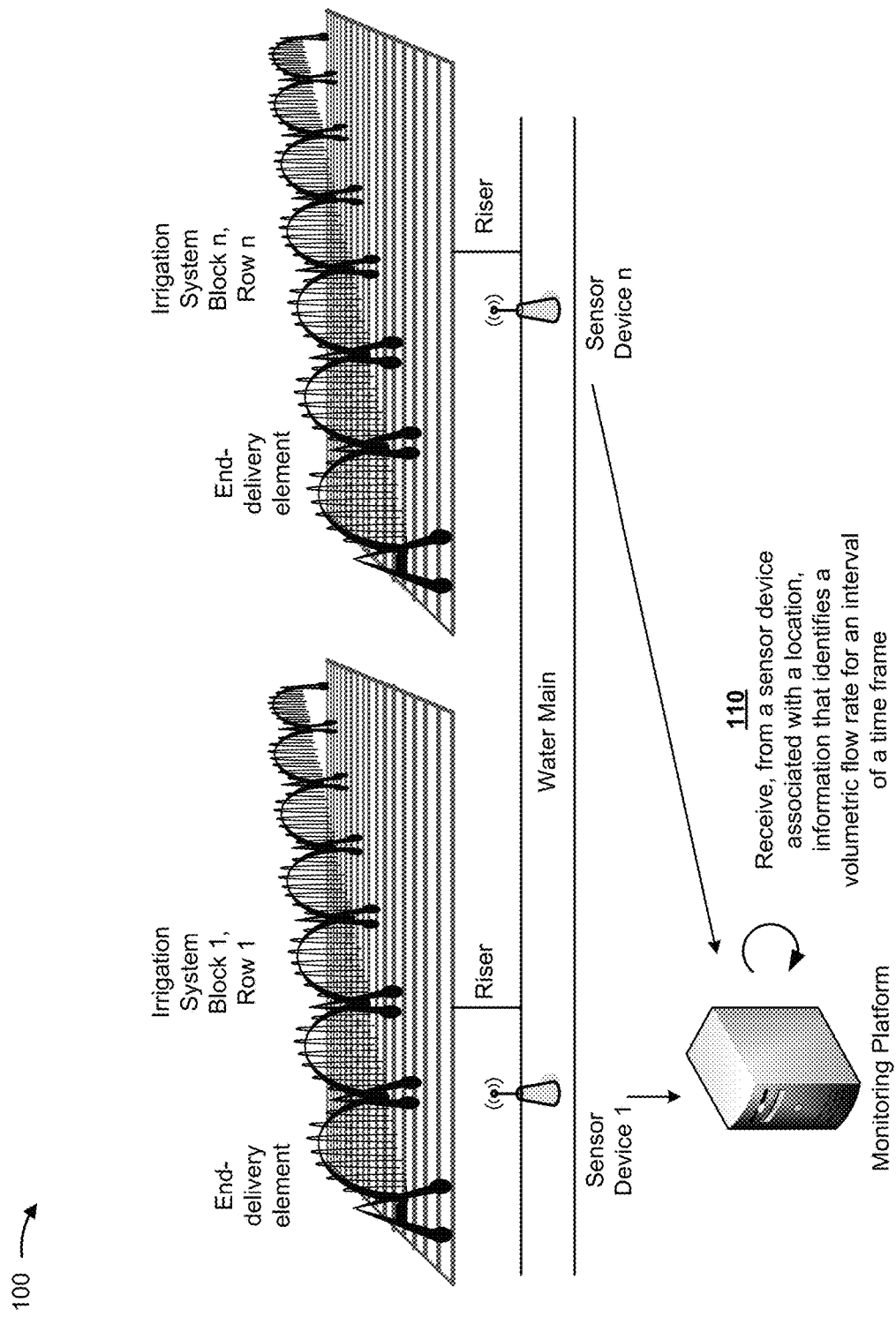

FIGS. 1A-1G are diagrams of an overview of an example implementation 100 described herein. As shown in FIG. 1A, and by reference number 110, a monitoring platform (e.g., a cloud computing device) can receive, from a sensor device (e.g., a flow meter) associated with a location, information that identifies a volumetric flow rate for an interval of a time frame. For example, as shown, an irrigation system can include a series of fluid transport elements (e.g., a water main pipe, a set of riser pipes, etc.), and end-delivery elements (e.g., irrigators). For example, as shown, a first end-delivery element can be associated with a first portion of a farm (e.g., block 1, row 1), and a second end-delivery element can be associated with a second portion of the farm (e.g., block n, row n). For example, a block can refer to a field, a zone, a plot, etc., and a row can refer to a particular portion of a block where seeds can be planted. As an example, a farming device, such as an air seeder, a harvester, etc., can perform a seed planting process (e.g., a sowing process, such as a ridge sowing process) whereby seeds, associated with a crop, are planted in association with rows of a block.

As shown, sensor device 1 can be associated with a location (e.g., block 1, row 1) of the irrigation system, and sensor device n can be associated with another location of the irrigation system (e.g., block n, row n). While two sensor devices are shown in FIG. 1A, in practice, the monitoring system can receive data from hundreds, thousands, etc. of sensor devices associated with various blocks and/or rows of a farm.

In some implementations, the monitoring platform can receive information that identifies a volumetric flow rate for an interval of a time frame. As an example, a time frame can refer to four hours, six hours, ten hours, twenty-four hours, etc., and an interval can refer to a subset of the time frame (e.g., fifteen minutes, thirty minutes, etc.). For example, sensor device 1 can measure a volumetric flow rate of water being provided via the water main, and can provide, to the monitoring platform, information that identifies the volumetric flow rate based on the interval (e.g., every fifteen minutes, etc.).

Figure 1B:
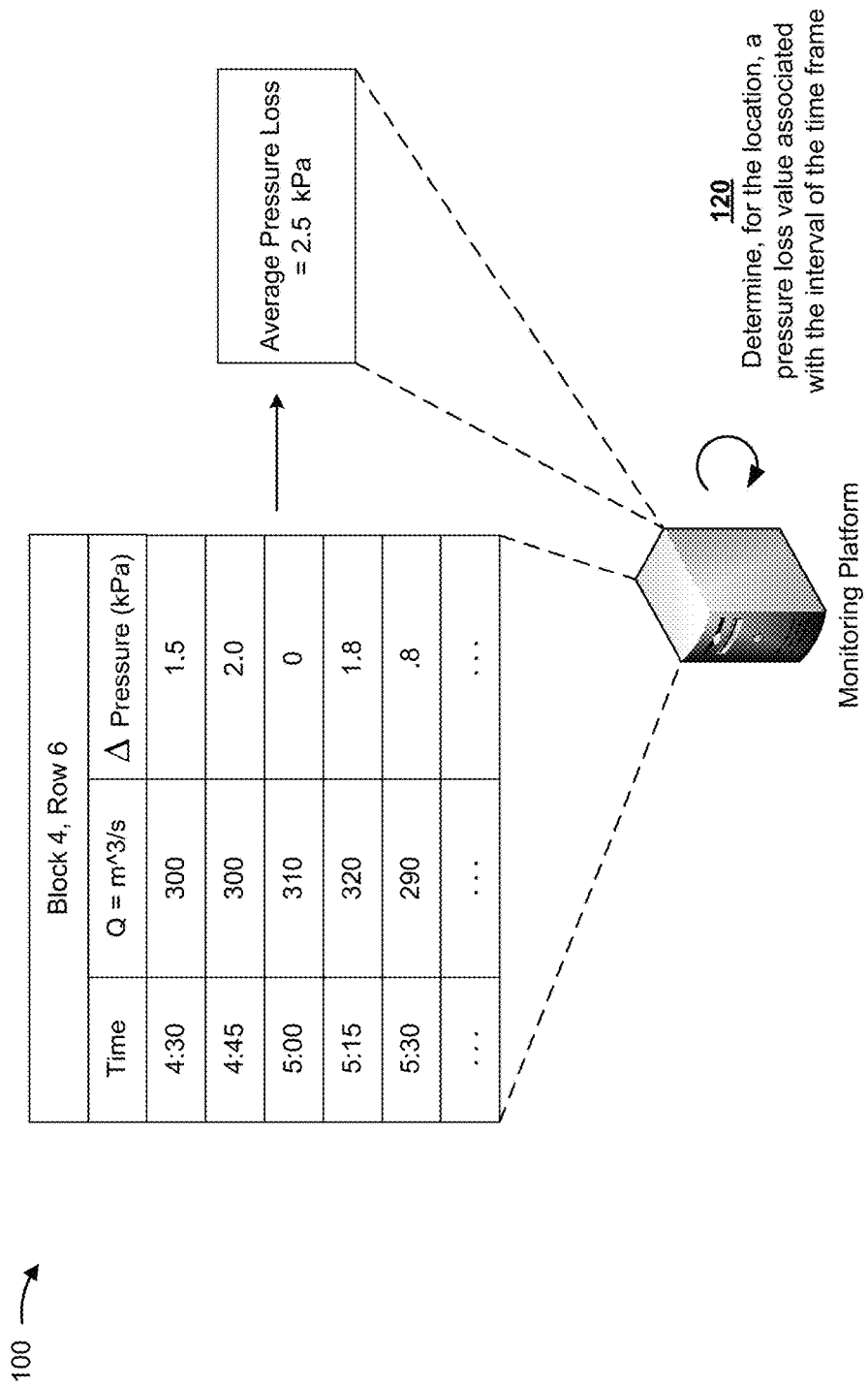

As shown in FIG. 1B, and by reference number 120, the monitoring platform can determine, for the location, a pressure loss value associated with the interval of the time frame. In some implementations, and as described below in connection with FIG. 4, the monitoring platform can determine a pressure loss value using a volumetric flow rate (e.g., shown as Q), a dynamic viscosity of water, and/or various other parameters of the sensor device. As shown, the monitoring platform can determine a set of pressure loss values (e.g., shown as ΔPressure) that correspond to particular intervals of the time frame. Additionally, as shown, the monitoring platform can determine an average pressure loss value, for the time frame, based on the set of pressure loss values (e.g., shown as 2.5 kilopascals (kPa)).

Figure 1C:
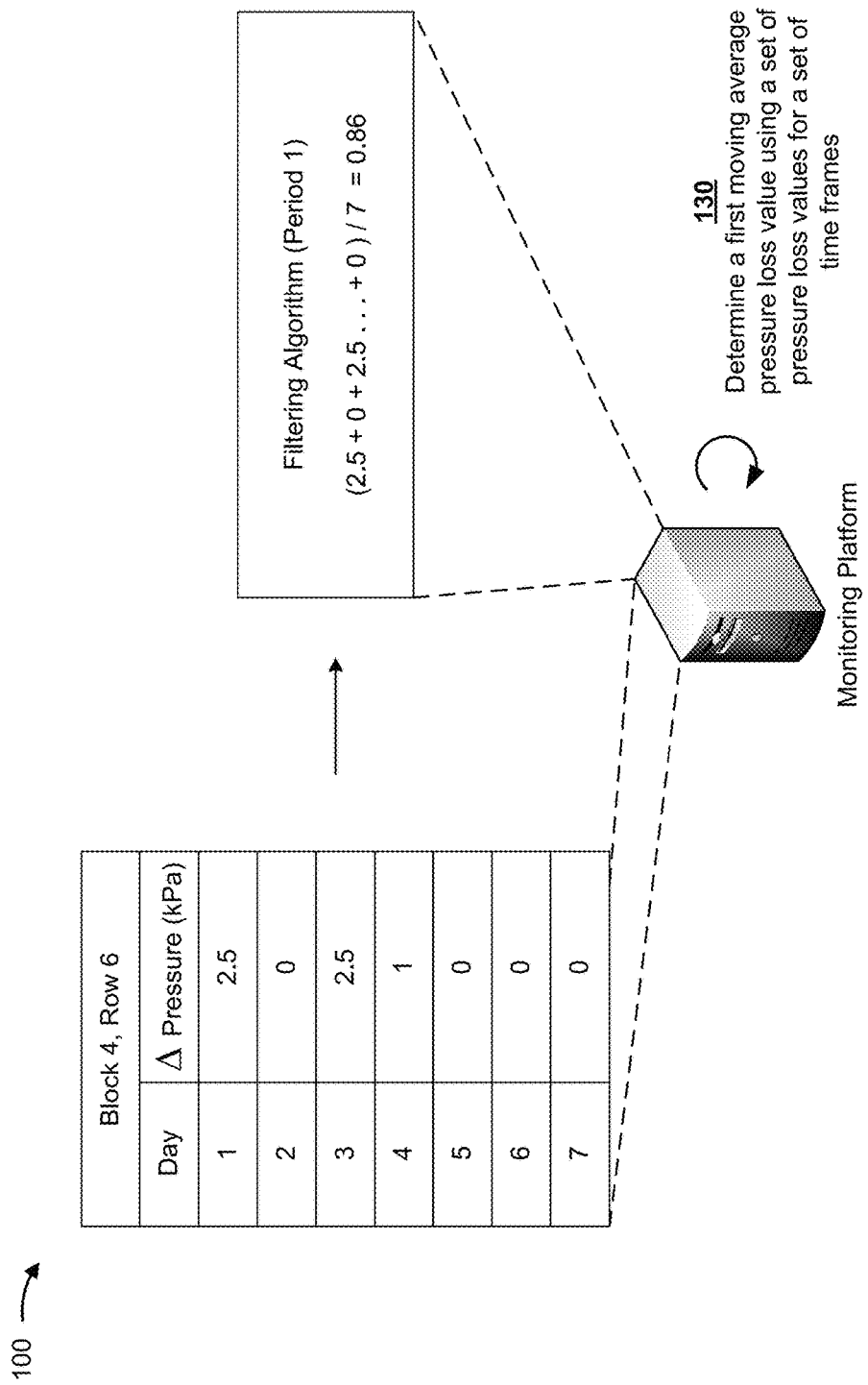

As shown in FIG. 1C, and by reference number 130, the monitoring platform can determine a first moving average pressure loss value using a set of pressure loss values for a set of time frames. For example, as shown, the monitoring platform can determine average pressure loss values for a set of time frames (e.g., an average pressure loss value for day one, an average pressure loss value for day two, etc.), and can determine a first moving average pressure loss value based on the set of average pressure loss values (e.g., using a filtering algorithm, such as a simple moving average). For example, the monitoring platform can determine a first moving average pressure loss value for a period (e.g., seven days) by performing a mathematical operation (e.g., determining a mean) in association with the average pressure loss values associated with the seven days of the period.

Figure 1D:
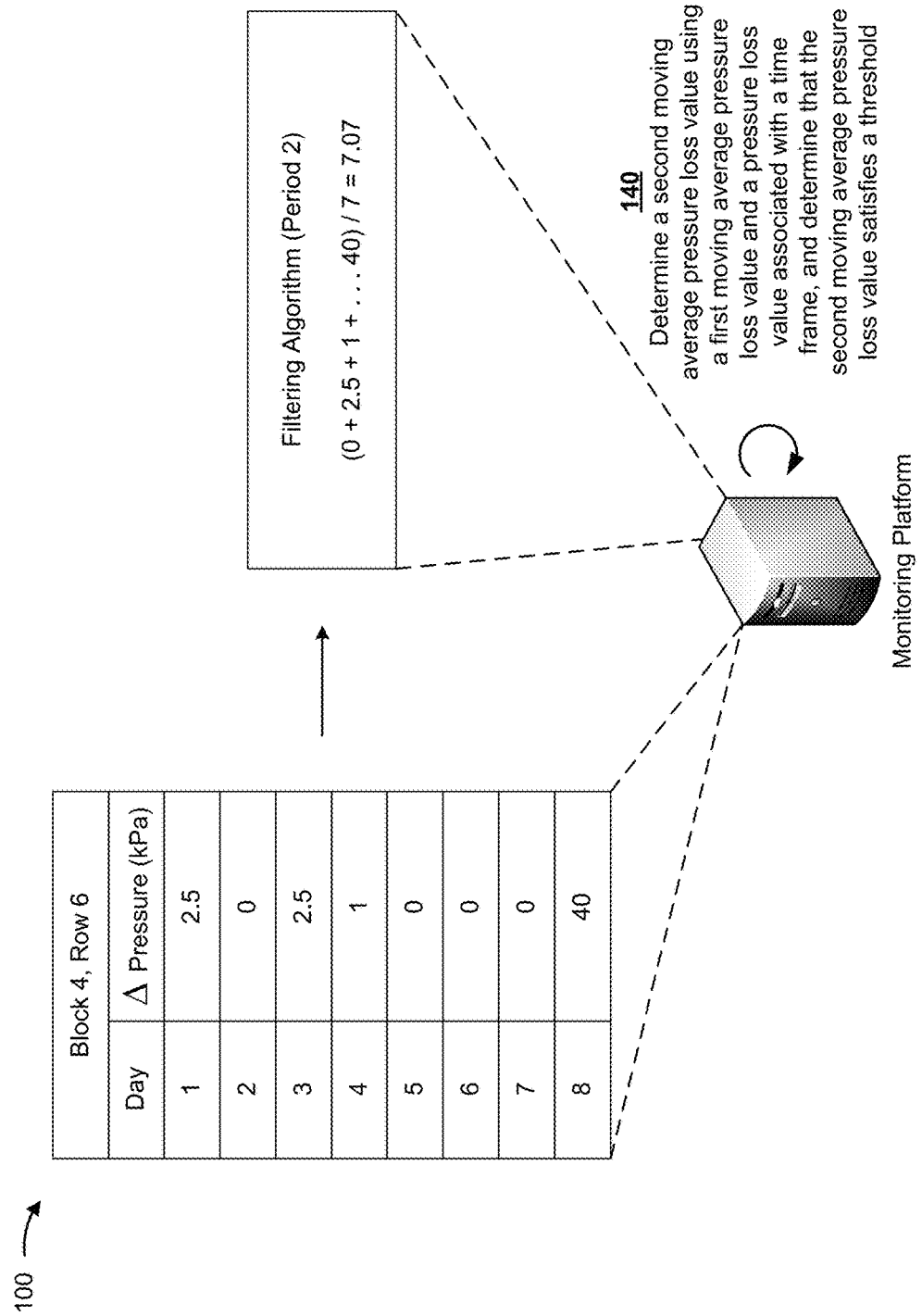

As shown in FIG. 1D, and by reference number 140, the monitoring platform can determine a second moving average pressure loss value using a previous moving average pressure loss value and a pressure loss value associated with a time frame, and determine that the second moving average pressure loss value satisfies a threshold. For example, assume that a leak has developed at a location associated with row six of block four. As shown, the monitoring platform can, using a filtering algorithm, determine the second moving average pressure loss value (e.g., for period two) using average pressure loss values associated with day two through day eight. As shown, assume that the second moving average pressure loss value of 7.07 kPa satisfies a threshold (e.g., is greater than a threshold, which can be indicative of a potential leak).

Figure 1E:
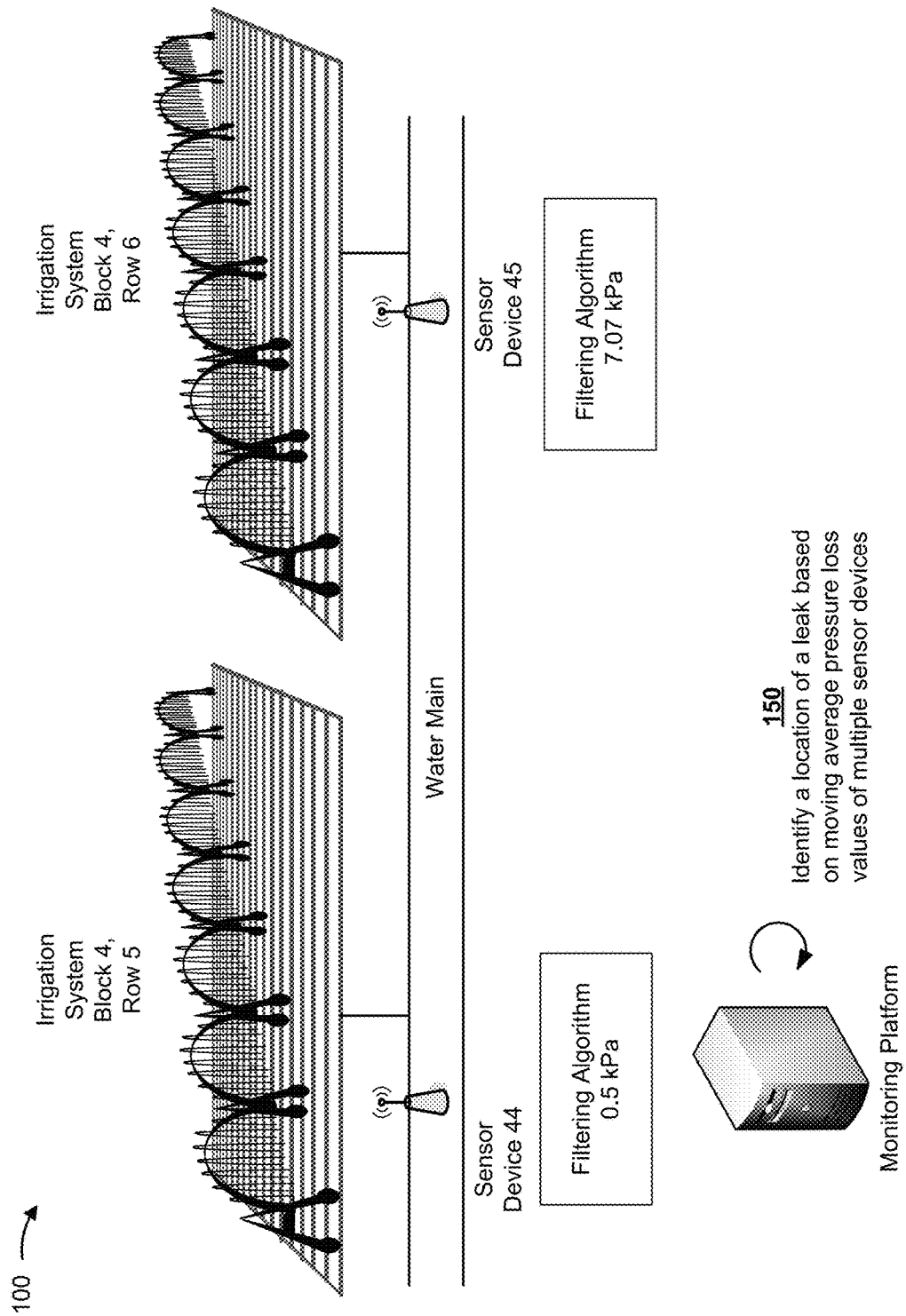

As shown in FIG. 1E, and by reference number 150, the monitoring platform can identify a location of a leak based on moving average pressure loss values of multiple sensor devices. For example, as shown, assume that sensor device 45 (e.g., associated with row six of block four) is associated with a moving average pressure loss value of 7.07 kPa. In this case, the monitoring platform can determine a moving average pressure loss value associated with sensor device 44. For example, sensor device 44 can be upstream as compared to sensor device 45 (e.g., closer to a source element, such as a pump, or the like). In this way, a leak that is associated with a location of sensor device 44 can affect pressure loss values associated with sensor device 45, whereas a leak associated with a location of sensor device 45 does not affect pressure loss values associated with a location of sensor device 44. As shown, assume that the moving average pressure loss value associated with sensor device 44 does not satisfy the threshold. In this case, the monitoring platform can determine that a location of the leak is associated with sensor device 45 (e.g., row six of block four). For example, the leak can be downstream of sensor device 44 and upstream of sensor device 45.

Figure 1F:
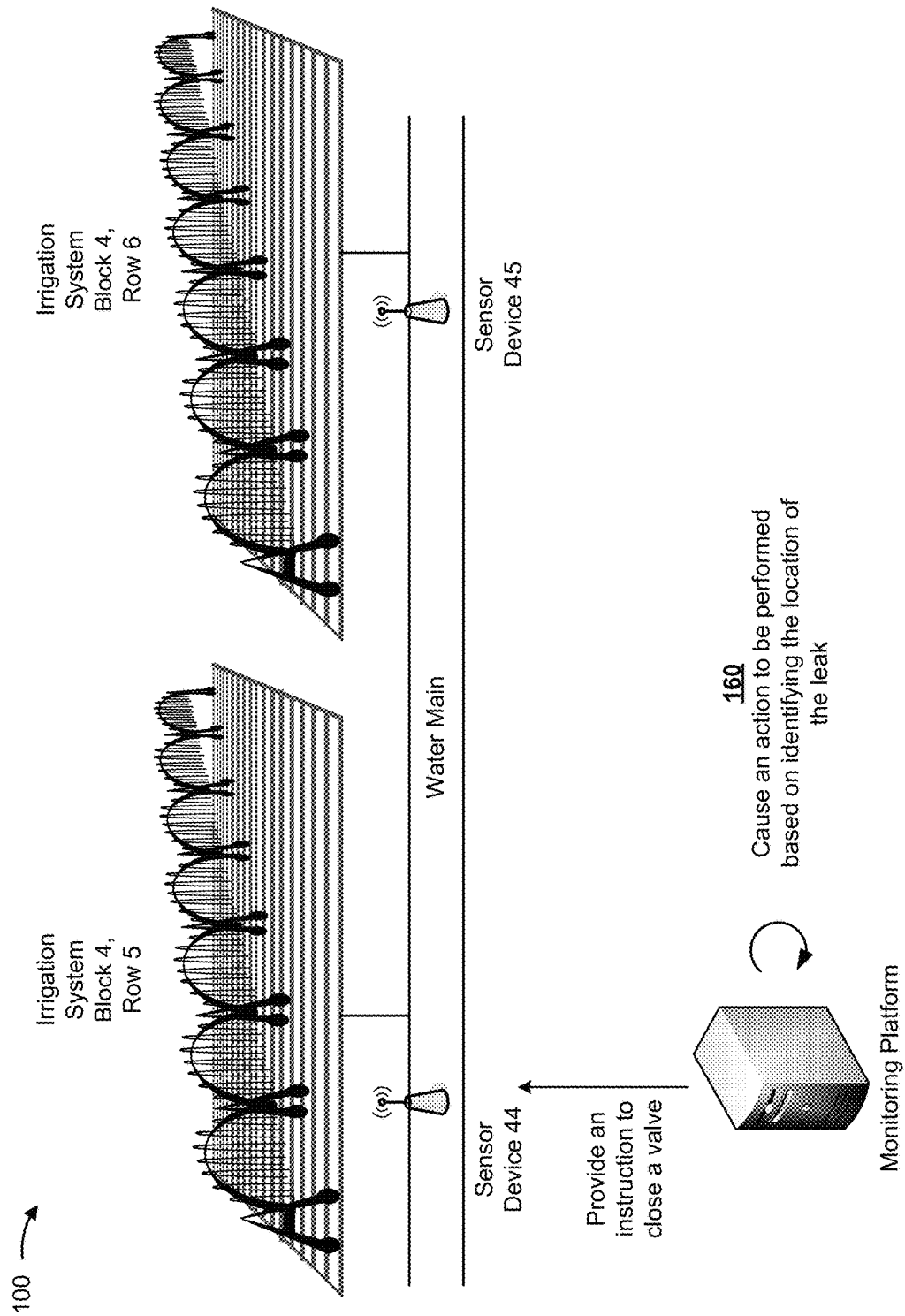

As shown in FIG. 1F, and by reference number 160, the monitoring platform can cause an action to be performed based on identifying the location of the leak. For example, as shown, the monitoring platform can provide, to sensor device 44, an instruction that causes sensor device 44 to close a valve associated with the water main. In this way, the monitoring platform can automatically prevent the leak from being exacerbated, can reduce a need of a user to implement other computing devices to attempt to ascertain a location of the leak, or the like. In this way, implementations described herein conserve processor and/or memory resources of computing devices by reducing a need of the user to utilize the computing devices for leak detection and/or rectification.

Additionally, implementations described herein conserve water, improve crop yield, prevent crop destruction, reduce expenses for a farmer, or the like. For example, implementations described herein enable portions of a farm, that are upstream of a leak, to continue to be irrigated, enable portions of a farm, that are downstream of the leak, to be prevented from being inundated, or the like. In this way, portions of the irrigation system, that are not affected by a leak, can continue to operate.

As shown in FIG. 1G, and by reference number 170, the monitoring platform can cause other actions to be performed based on identifying the location of the leak. For example, as shown, the monitoring platform can provide, to a user device (e.g., a tablet computer), a message requesting a service to be performed. For example, a user (e.g., associated with an entity that can repair the irrigation system) can be notified of the leak, and/or can be notified of a scheduled repair of the irrigation system. Additionally, as shown, the monitoring platform can provide, to an unmanned aerial vehicle (UAV), an instruction to prevent the UAV from spraying fertilizer in association with the block associated with the leak. Alternatively, the monitoring platform can provide an instruction to a UAV that causes the UAV to irrigate the block associated with the leak (e.g., because the irrigation system is rendered inoperable).

In this way, implementations described herein enable a monitoring platform to receive, from a set of sensor devices, information that identifies respective volumetric flow rates, and determine moving average pressure loss values based on the volumetric flow rates. Additionally, implementations described herein enable the monitoring platform to compare moving average pressure loss values for particular locations of the irrigation system, and identify a location of a leak based on the moving average pressure loss values. Additionally, implementations described herein enable the monitoring platform to automatically cause actions to be performed based on the location of the leak (e.g., schedule a repair, prevent further flow of water and/or fertilizer towards the leak, or the like). In this way, implementations described herein conserve processor and/or memory resources of computing devices that would otherwise be needed to attempt to identify a leak.

As indicated above, FIGS. 1A-1G are provided merely as an example. Other examples are possible and can differ from what was described with regard to FIGS. 1A-1G.

While implementations herein describe monitoring locations of an irrigation system, it should be understood that implementations described herein are applicable to other types of transport and/or delivery systems (e.g., other fluid transport systems, gas transport systems, etc.).

Figure 2:
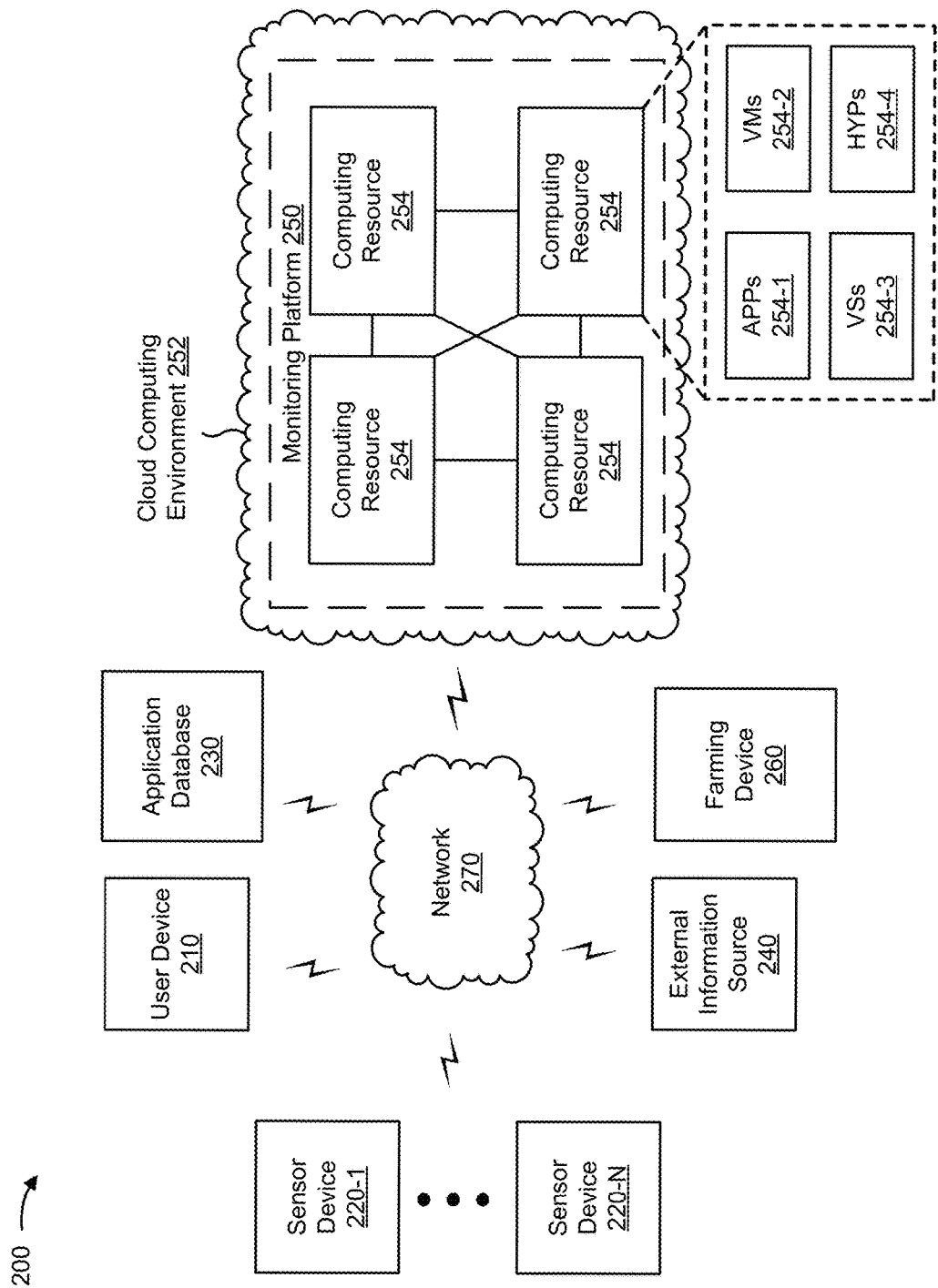
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include user device 210, one or more sensor devices 220-1 through 220-N (N≥1) (hereinafter referred to collectively as "sensor devices 220," and individually as "sensor device 220"), an application database 230, an external information source 240, a monitoring platform 250, a farming device 260, and a network 270. Devices of environment 200 can interconnect via wired connections, wireless connections, or a combination of wired and wireless connections.

User device 210 includes one or more devices capable of receiving, generating, storing, processing, and/or providing information associated with monitoring platform 250. For example, user device 210 can include a computing device (e.g., a desktop computer, a laptop computer, a tablet computer, a handheld computer, a server, etc.), a mobile phone (e.g., a smart phone, a radiotelephone, etc.), a wearable device (e.g., a pair of smart glasses or a smart watch), or a similar device. In some implementations, user device 210 can receive information from and/or transmit information to monitoring platform 250.

Sensor device 220 includes one or more devices for obtaining sensor-related information. For example, sensor device 220 can include a sensor capable of measuring a volumetric flow rate of a liquid, gas, or the like (e.g., a flow meter, a turbine flow meter, a rotameter, a piston meter, etc.), a camera (e.g., a visual spectrum imaging camera, an infrared or near infrared imaging camera, a multispectral imaging camera, a hyperspectral imaging camera, a thermal imaging camera, a laser mapping imagery camera, etc.), a sonar device capable of generating sonar-generated mapping imagery, a sensor capable of detecting precipitation, a sensor capable of detecting sunshine, a sensor capable of detecting relative humidity, a sensor capable of detecting radiation, a sensor capable of detecting atmospheric pressure, a sensor capable of detecting temperature above ground, a sensor capable of detecting temperature at one or more depths below ground, a sensor capable of detecting wind direction, a sensor capable of detecting wind speed, a sensor capable of detecting rainfall, a sensor capable of detecting irrigation flow, a sensor capable of detecting soil moisture, a sensor capable of detecting soil salinity, a sensor capable of detecting soil density, a sensor capable of detecting sap flow, a sensor capable of detecting equipment operating parameters, and/or any other sensor that would aid in making operational farming decisions. In some implementations, sensor device 220 includes a machine-to-machine (M2M) device and/or an Internet of Things (IoT) device (e.g., any "thing" in the IoT). In some implementations, sensor device 220 can include or be attached to an unmanned aerial vehicle (UAV), an item of farming equipment (e.g., a tractor, an irrigation system, or the like), a tower (e.g., a cell tower or the like), or another type of device/vehicle. In practice, there can be hundreds, thousands, or millions of sensor devices 220 detecting various kinds of sensor data.

Application database 230 includes one or more devices capable of receiving, generating, storing, processing, and/or providing information associated with monitoring platform 250. For example, application database 230 can include a computing device, such as a server, a desktop computer, a laptop computer, a tablet computer, a handheld computer, or a similar device. Application database 230 can store information from a variety of sources and from multiple farms. For example, the information can include information from sensor devices 220 (e.g., volumetric flow rate data, pressure loss data, etc.), information from external information source 240 (e.g., environmental condition information, weather information, etc.), information relating to operations of a farm (e.g., actions taken based on recommendations, whether the actions resulted in fixing any identified problems, historical field data, past outcomes, etc.), and/or another type of information that can aid in determining actions to perform in relation to the operation of a farm.

External information source 240 includes one or more devices, accessible through a network, that are sources of information relevant to agricultural decision making. For example, external information source 240 can include a server that provides Doppler weather forecasts, a server that provides satellite imagery, a server that provides vegetation and soil indexes, a server that provides seed/genetic data from manufacturers, a server that provides market data for specific crops, the United States Department of Agriculture (USDA) "soil type" database, weather forecast data from a national government or private weather services, a server that provides cloud based image processing to build crop health indices (e.g., such as Normalized Difference Vegetation Index (NDVI) images), a server that provides financial data relating to crops, a device via which a farmer provides best practice information, a device via which an agronomist provides farming-related information, and/or any other type of device that provides information that can aid in determining actions to perform in relation to the operation of a farm.

Monitoring platform 250 includes one or more devices capable of receiving information identifying volumetric flow rates, determining moving average pressure loss values, and identifying a location of a leak based on the moving average pressure loss values, as described elsewhere herein. In some implementations, monitoring platform 250 can include a cloud server or a group of cloud servers. In some implementations, monitoring platform 250 can be designed to be modular such that certain software components can be swapped in or out depending on a particular need. As such, monitoring platform 250 can be easily and/or quickly reconfigured for different uses.

In some implementations, as shown, monitoring platform 250 can be hosted in cloud computing environment 252. Notably, while implementations described herein describe monitoring platform 250 as being hosted in cloud computing environment 252, in some implementations, monitoring platform 250 is not be cloud-based (i.e., can be implemented outside of a cloud computing environment) or can be partially cloud-based.

Cloud computing environment 252 includes an environment that hosts monitoring platform 250. Cloud computing environment 252 can provide computation, software, data access, storage, etc. services that do not require end-user (e.g., user device 210, sensor device 220, etc.) knowledge of a physical location and configuration of system(s) and/or device(s) that hosts monitoring platform 250. As shown, cloud computing environment 252 can include a group of computing resources 254 (referred to collectively as "computing resources 254" and individually as "computing resource 254").

Computing resource 254 includes one or more personal computers, workstation computers, server devices, or other types of computation and/or communication devices. In some implementations, computing resource 254 can host monitoring platform 250. The cloud resources can include compute instances executing in computing resource 254, storage devices provided in computing resource 254, data transfer devices provided by computing resource 254, etc. In some implementations, computing resource 254 can communicate with other computing resources 254 via wired connections, wireless connections, or a combination of wired and wireless connections.

As further shown in FIG. 2, computing resource 254 includes a group of cloud resources, such as one or more applications ("APPs") 254-1, one or more virtual machines ("VMs") 254-2, virtualized storage ("VSs") 254-3, one or more hypervisors ("HYPs") 254-4, or the like.

Application 254-1 includes one or more software applications that can be provided to or accessed by user device 210 and/or sensor device 220. Application 254-1 can eliminate a need to install and execute the software applications on user device 210 and/or sensor device 220. For example, application 254-1 can include software associated with monitoring platform 250 and/or any other software capable of being provided via cloud computing environment 252. In some implementations, one application 254-1 can send/receive information to/from one or more other applications 254-1, via virtual machine 254-2.

Virtual machine 254-2 includes a software implementation of a machine (e.g., a computer) that executes programs like a physical machine. Virtual machine 254-2 can be either a system virtual machine or a process virtual machine, depending upon use and degree of correspondence to any real machine by virtual machine 254-2. A system virtual machine can provide a complete system platform that supports execution of a complete operating system ("OS"). A process virtual machine can execute a single program, and can support a single process. In some implementations, virtual machine 254-2 can execute on behalf of a user (e.g., user device 210 and/or sensor device 220), and can manage infrastructure of cloud computing environment 252, such as data management, synchronization, or long-duration data transfers.

Virtualized storage 254-3 includes one or more storage systems and/or one or more devices that use virtualization techniques within the storage systems or devices of computing resource 254. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 254-4 can provide hardware virtualization techniques that allow multiple operating systems (e.g., "guest operating systems") to execute concurrently on a host computer, such as computing resource 254. Hypervisor 254-4 can present a virtual operating platform to the guest operating systems, and can manage the execution of the guest operating systems. Multiple instances of a variety of operating systems can share virtualized hardware resources.

Farming device 260 includes one or more devices that provide a service at a farm. For example, farming device 260 can include an irrigation device, a tractor, a device associated with soil cultivation (e.g., a cultivator), a device relating to planting (e.g., an air seeder), a device relating to spraying an insecticide or another fluid (e.g., a sprayer), a device relating to fertilizing (e.g., a fertilizer spreader), a device relating to harvesting (e.g., a harvester), a UAV, a farm worker scheduling system, and/or another similar type of device. In some implementations, farming device 260 can receive information from monitoring platform 250 and perform an action based on receiving the information.

Network 270 includes one or more wired and/or wireless networks. For example, network 270 can include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
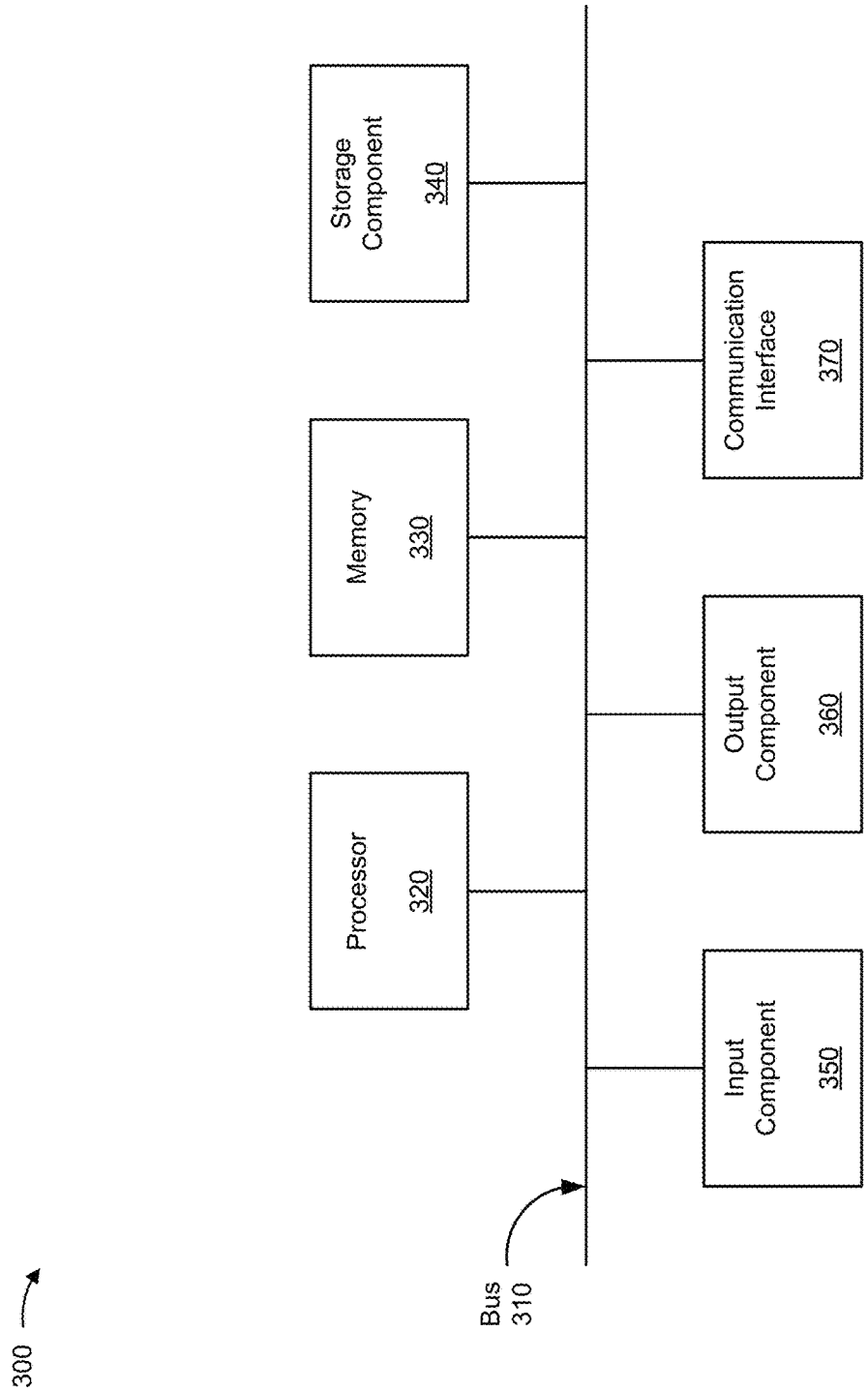
FIG. 3 is a diagram of example components of one or more devices of FIG. 2.

FIG. 3 is a diagram of example components of a device 300. Device 300 can correspond to user device 210, sensor device 220, application database 230, external information source 240, monitoring platform 250, computing resource 254, and/or farming device 260. In some implementations, user device 210, sensor device 220, application database 230, external information source 240, monitoring platform 250, computing resource 254, and/or farming device 260 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
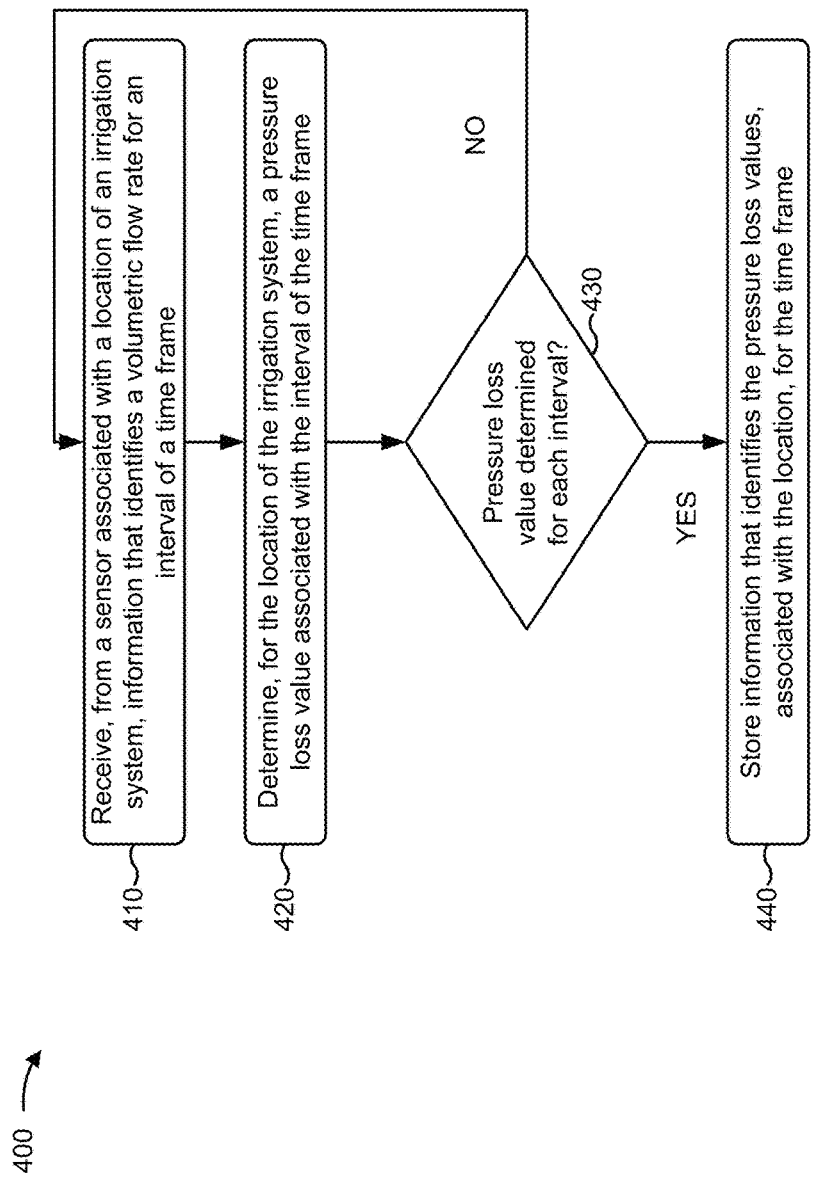
FIG. 4 is a flow chart of an example process for determining, for a time frame, a pressure loss value for a location of an irrigation system.

FIG. 4 is a flow chart of an example process 400 for determining, for a time frame, a pressure loss value for a location of an irrigation system. In some implementations, one or more process blocks of FIG. 4 can be performed by monitoring platform 250. In some implementations, one or more process blocks of FIG. 4 can be performed by another device or a group of devices separate from or including monitoring platform 250, such as user device 210, sensor device 220, application database 230, external information source 240, and/or farming device 260.

As shown in FIG. 4, process 400 can include receiving, from a sensor associated with a location of an irrigation system, information that identifies a volumetric flow rate for an interval of a time frame (block 410). For example, monitoring platform 250 can receive, from sensor device 220 associated with a location of an irrigation system, information that identifies a volumetric flow rate for an interval of a time frame. In some implementations, monitoring platform 250 can monitor an irrigation system that includes a source element (e.g., a reservoir, a supply tank, or the like), a set of fluid movement control elements (e.g., pumps, valves, etc.), a set of fluid transport elements (e.g., a main pipe, a set of feeder pipes, a set of riser pipes, etc.), and/or a set of end-delivery elements (e.g., drip irrigators, sprinklers, etc.).

In some implementations, monitoring platform 250 can receive, from sensor devices 220, information associated with the irrigation system. In some implementations, sensor devices 220 can include flow meters, such as devices that measure volumetric flow rates of a liquid associated with the irrigation system (e.g., water, a chemical, or the like). In some implementations, a particular sensor device 220 can be associated with a particular location, such as a geographic location, a location associated with a particular portion of the irrigation system (e.g., a section of piping, a section of a farm, etc.), or the like. That is, particular sensor devices 220 can correspond to particular portions of the irrigation system.

In some implementations, sensor device 220 can provide, to monitoring platform 250, the information that identifies the volumetric flow rate. For example, sensor device 220 can measure a volumetric flow rate of a liquid that is being provided via the irrigation system (e.g., from a source element to an end-delivery element). Additionally, or alternatively, sensor device 220 can provide the information that identifies the volumetric flow rate based on an interval of a time frame. As a particular example, the time frame can refer to a day, a portion of a day (e.g., four hours, six hours, nine hours, etc.), or the like. Continuing the example, an interval of a time frame can refer to a subset of the time frame (e.g., five minutes, fifteen minutes, thirty minutes, etc.).

In some implementations, the irrigation system can be associated with hundreds, thousands, millions, etc. of sensor devices 220 (e.g., that correspond to different locations of the irrigation system). Additionally, or alternatively, monitoring platform 250 can receive, from sensor devices 220, information that identifies respective volumetric flow rates, and perform one or more big data processing techniques based on the information.

As further shown in FIG. 4, process 400 can include determining, for the location of the irrigation system, a pressure loss value associated with the interval of the time frame (block 420). For example, monitoring platform 250 can determine, for the location of the irrigation system, a pressure loss value associated with the interval of the time frame. In some implementations, monitoring platform 250 can determine a variation in pressure based on the following expression (i.e., the Hagen-Poiseuille equation):

$$\Delta P = 128 \mu L Q \div \pi d^4$$

For example, "$\Delta P$" can refer to a variation in pressure (e.g., a pressure loss), "$\mu$" can refer to a dynamic viscosity of a fluid associated with the irrigation system, "$Q$" can refer to the volumetric flow rate (e.g., in cubic meters per second), "$L$" can refer to the length of a pipe associated with the irrigation system (e.g., a portion of the pipe that corresponds to the flow meter), and "$d$" can refer to a diameter of the pipe (e.g., a diameter of the flow meter).

As further shown in FIG. 4, process 400 can include determining whether a pressure loss value has been determined for each interval of the time frame (block 430). For example, monitoring platform 250 can determine whether a pressure loss value has been determined for each interval of the time frame. As an example, if the time frame includes six hours and an interval includes fifteen minutes, then monitoring platform 250 can determine whether twenty-four pressure loss values have been determined (e.g., corresponding to each interval of the time frame).

As further shown in FIG. 4, if a pressure loss value has not been determined for each interval of the time frame (block 430—NO), then monitoring platform 250 can perform operations of block 410 and block 420 until a pressure loss value has been determined for each interval of the time frame.

As further shown in FIG. 4, if a pressure loss value has been determined for each interval of the time frame (block 430—YES), then process 400 can include storing information that identifies the pressure loss values, associated with the location, for the time frame (block 440). For example, monitoring platform 250 can store information that identifies the pressure loss values, and can determine a moving average pressure loss value based on the stored pressure loss values, as described below in connection with FIG. 5.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5:
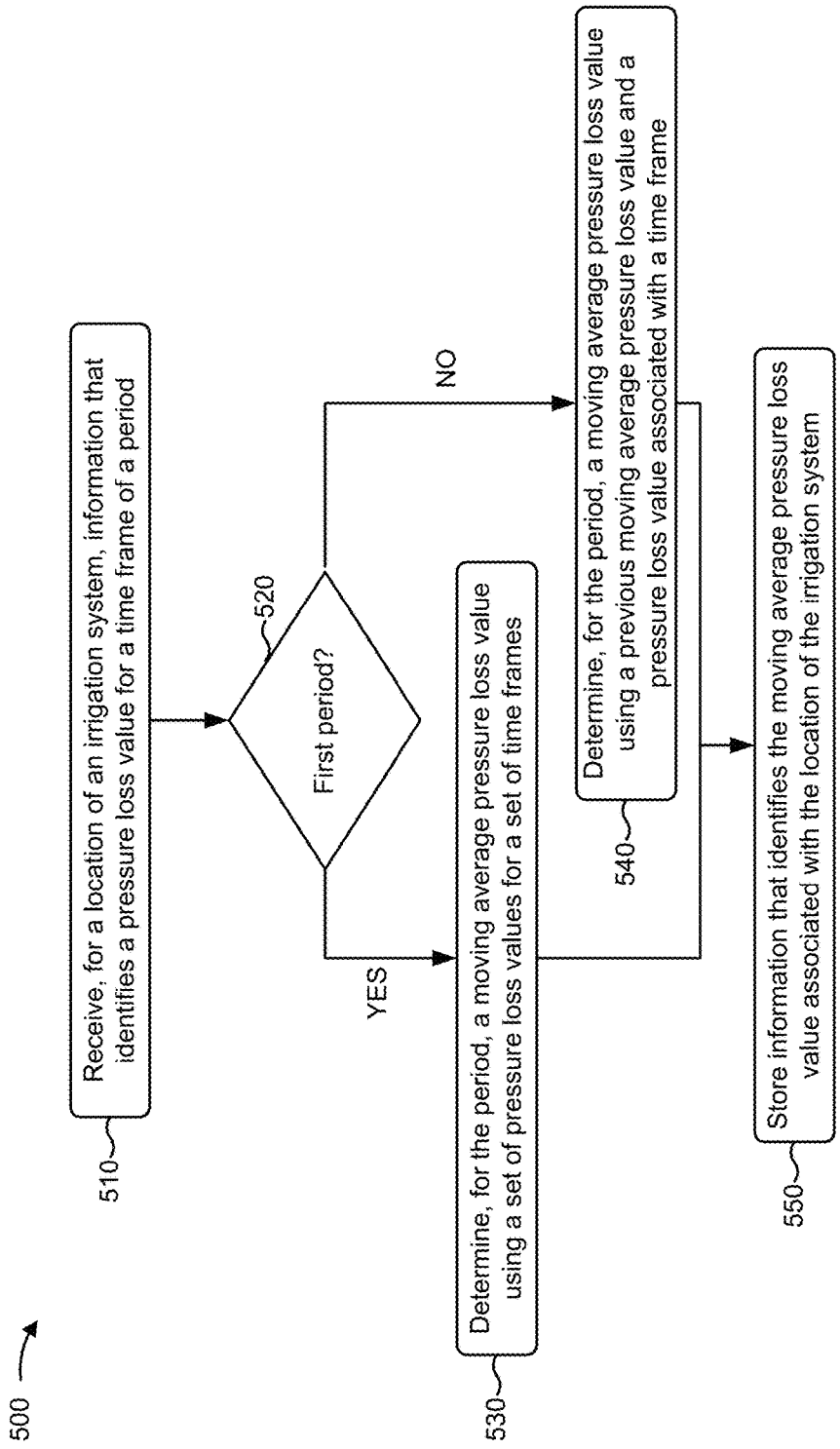
FIG. 5 is a flow chart of an example process for determining a moving average pressure loss value for the location, of the irrigation system, based on a period.

FIG. 5 is a flow chart of an example process 500 for determining a moving average pressure loss value for the location, of the irrigation system, based on a period. In some implementations, one or more process blocks of FIG. 5 can be performed by monitoring platform 250. In some implementations, one or more process blocks of FIG. 5 can be performed by another device or a group of devices separate from or including monitoring platform 250, such as user device 210, sensor device 220, application database 230, external information source 240, and/or farming device 260.

As shown in FIG. 5, process 500 can include receiving, for a location of an irrigation system, information that identifies a pressure loss value for a time frame of a period (block 510). For example, monitoring platform 250 can receive, for a location of the irrigation system, information that identifies a pressure loss value for a time frame of a period. In some implementations, monitoring platform 250 can receive the information that identifies the pressure loss value based on stored information (e.g., stored as described above in connection with FIG. 4). In some implementations, a period can refer to a period of time. As an example, a period can include five days, six days, seven days, ten days, etc. Continuing the example, a time frame can refer to a day, two days, etc. That is, a time frame can refer to a subset of a period. In some implementations, monitoring platform 250 can perform a mathematical operation (e.g., can determine a median, can determine a mean, etc.) using pressure loss values for the respective intervals of the time frame to determine a pressure loss value for the time frame.

As further shown in FIG. 5, process 500 can include determining whether a moving average pressure loss value has been determined for a previous period (block 520). For example, monitoring platform 250 can determine whether a moving average pressure loss value has been determined for a previous period. Continuing the example described above, if a period includes seven days, then monitoring platform 250 can determine whether seven pressure loss values have been determined (e.g., corresponding to each time frame of the period), and/or whether a moving average pressure loss value has been determined based on the seven pressure loss values.

As further shown in FIG. 5, if a moving average pressure loss value associated with a previous period has not been determined (block 520—YES), then process 500 can include determining, for the period, a moving average pressure loss value using a set of pressure loss values for a set of time frames (block 530). For example, monitoring platform 250 can determine a moving average pressure loss value using a set of pressure loss values for a set of time frames in the event that monitoring platform 250 has not previously determined a moving average pressure loss value for a period.

In some implementations, monitoring platform 250 can determine a moving average pressure loss value using a technique (e.g., a finite impulse response filtering technique, a noise filtering technique, a moving average technique, etc.). For example, monitoring platform 250 can determine an average pressure loss value using the following expression:

$$SMA = \frac{1}{n}\sum_{i=0}^{n-1} Pm - i$$

For example, "SMA" can refer to "simple moving average," "n" can refer to a period (e.g., seven days), "Pm" can refer to a pressure loss value for a particular time frame (e.g., pressure loss value for a particular day), and "i" can refer to a time frame of the period (e.g., a particular day). In some implementations, for the first period, monitoring platform 250 can determine a moving average pressure loss value based on determining a sum of each of the pressure loss values for each time frame of the period (e.g., $Pm_1 + Pm_2$, . . . $+ Pm_7$), and dividing the sum by a value of the period (e.g., seven). While implementations describe particular values for periods, time frames, and/or intervals, it should be understood that other implementations include other values for periods, time frames, and/or intervals. Additionally, while implementations herein describe the determination of a simple moving average, other implementations include other types of averages, such as a cumulative moving average, a weighted moving average, an exponential moving average, a modified moving average, another filtering algorithm, etc.

As further shown in FIG. 5, if a moving average pressure loss value associated with a previous period has been determined (block 520—NO), then process 500 can include determining, for the period, a moving average pressure loss value using a previous moving average pressure loss value and a pressure loss value associated with a time frame (block 540). For example, monitoring platform 250 can determine, for the period, a moving average pressure loss value using a previous moving average pressure loss value (e.g., associated with a previous period) and a pressure loss value associated with a time frame.

In some implementations, monitoring platform 250 can determine a moving average pressure loss value using the following expression:

$$SMA_{current\ period} = SMA_{previous\ period} + \frac{Pm}{n} - \frac{Pm - n}{n}$$

For example, "$SMA_{current\ period}$" can refer to the period for which monitoring platform 250 is determining a moving average pressure loss value, and "$SMA_{previous\ period}$" can refer to a previous period for which monitoring platform 250 determined a moving average pressure loss value. As an example, assume that a period includes seven days, and that monitoring platform 250 has determined pressure loss values for eight days. In this case, "$SMA_{previous\ period}$" can refer to a moving average pressure loss value determined based on pressure loss values associated with the first seven days, and "$SMA_{current\ period}$" can refer to a moving average pressure loss value determined based on pressure loss values associated with the second day through the eighth day. For example, in this case, $$"\frac{Pm}{n}"$$

can refer to a pressure toss value associated with the eighth day (e.g., a current day), and $$"\frac{Pm - n}{n}"$$

can refer to a pressure loss value associated with the first day (e.g., n days prior to the current day). That is, the moving average pressure loss value can include an average of n pressure loss values, that is updated based on monitoring platform 250 receiving additional pressure loss values for time frames.

By determining a moving average pressure loss value, monitoring platform 250 can reduce a number of instances where monitoring platform 250 erroneously determines a leak (e.g., a false positive). For example, by monitoring a moving average pressure loss value (e.g., a value determined based on multiple data points) rather than particular pressure loss values (e.g., a value determined based on limited data points), monitoring platform 250 can reduce the effects of noise (e.g., pressure loss values not associated with leaks), and thereby can reduce a number of false positives. In this way, monitoring platform 250 can conserve processor and/or memory resources of monitoring platform 250 and/or conserve network resources based on reducing a number of instances where monitoring platform 250 determines a false positive and provides information, associated with the false positive, to permit and/or cause an action to be performed.

As further shown in FIG. 5, process 500 can include storing information that identifies the moving average pressure loss value associated with the location of the irrigation system (block 550). For example, monitoring platform 250 can store information that identifies the moving average pressure loss value associated with the location of the irrigation system. In some implementations, monitoring platform 250 can determine moving average pressure loss values associated with a set of locations of the irrigation system (e.g., associated with respective sensor devices 220). For example, monitoring platform 250 can perform operations of blocks 510-540 for hundreds, thousands, etc. of locations of the irrigation system based on respective data from sensor devices 220. In this way, monitoring platform 250 can identify a location of a leak based on the moving average pressure loss values, as described below in connection with FIG. 6.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

Figure 6:
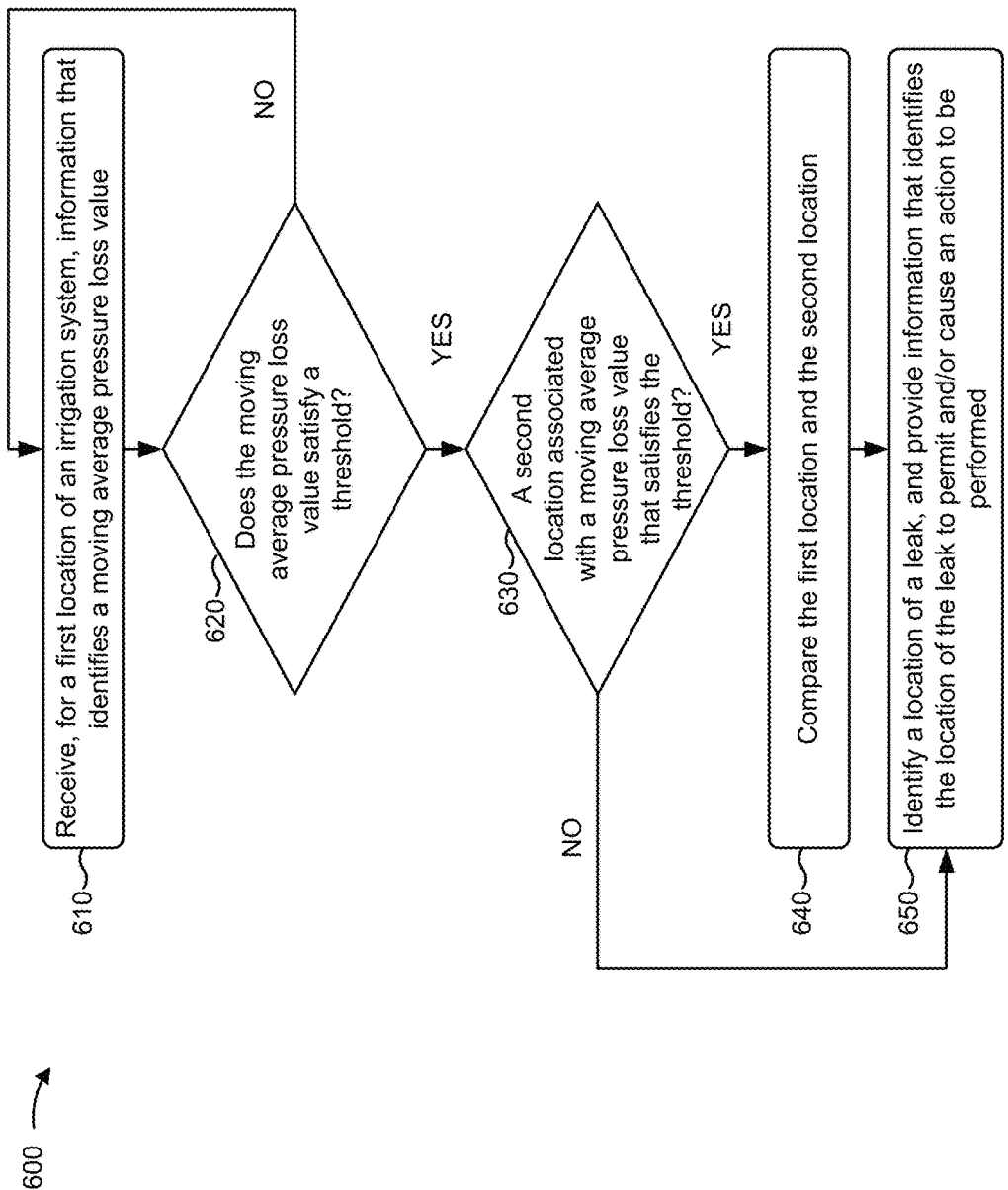
FIG. 6 is a flow chart of an example process for performing leak detection using moving average pressure loss values for multiple locations of the irrigation system.

FIG. 6 is a flow chart of an example process 600 for performing leak detection using moving average pressure loss values for multiple locations of the irrigation system. In some implementations, one or more process blocks of FIG. 6 can be performed by monitoring platform 250. In some implementations, one or more process blocks of FIG. 6 can be performed by another device or a group of devices separate from or including monitoring platform 250, such as user device 210, sensor device 220, application database 230, external information source 240, and/or farming device 260.

As shown in FIG. 6, process 600 can include receiving, for a first location of an irrigation system, information that identifies a moving average pressure loss value (block 610), and determining whether the moving average pressure loss value satisfies a threshold (block 620). For example, monitoring platform 250 can receive, for a location of the irrigation system, information that identifies a moving average pressure loss value based on stored information (e.g., as described above in connection with FIG. 5), and can determine whether the moving average pressure loss value satisfies a threshold.

In some implementations, the threshold can refer to a threshold pressure loss value (e.g., a threshold pressure loss value that is indicative of a potential issue, such as a leak, a failure associated with the irrigation system, a potential failure of the irrigation system, or the like). Additionally, or alternatively, the threshold can refer to a previous moving average pressure loss value (e.g., associated with a previous period, an average pressure loss value associated with multiple previous periods, or the like). In some implementations, monitoring platform 250 can compare the threshold and a moving average pressure loss value associated with a location of the irrigation system, and can determine whether the moving average pressure loss value satisfies the threshold based on the comparison. For example, monitoring platform 250 can compare the threshold and moving average pressure loss values associated with each sensor device 220 (e.g., each location of the irrigation system).

In some implementations, monitoring platform 250 can determine the threshold based on a technique. For example, monitoring platform 250 can use one or more machine learning techniques to analyze data (e.g., training data, such as moving average pressure loss values for particular periods associated with leaks) and to create a model that determines the threshold. The techniques can include, for example, supervised and/or unsupervised learning techniques, such as artificial networks, case-based reasoning, Bayesian statistics, learning automata, Hidden Markov Modeling, linear classifiers, quadratic classifiers, decision trees, association rule learning, or the like. Additionally, or alternatively, monitoring platform 250 can use another kind of computer-implemented technique, such as artificial intelligence, machine perception, or computer vision, to analyze data and generate models. In this way, monitoring platform 250 can receive information that identifies known moving average pressure loss values, known periods, and known leaks, and can create models using the information. Additionally, in this way, monitoring platform 250 can receive information that identifies additional moving average pressure loss values, and can identify leaks based on a model.

In some implementations, monitoring platform 250 can perform an initial comparison of a moving average pressure loss value and the threshold based on a particular location of the irrigation system. For example, assume that the irrigation system is associated with a source element (e.g., an upstream element) and an end-delivery element (e.g., a downstream element). In this case, monitoring platform 250 can perform an initial comparison based on a location of a particular sensor device 220 that is closest to the end-delivery element. Alternatively, monitoring platform 250 can perform an initial comparison based on a location of a particular sensor device 220 that is closest to the source element. In this way, monitoring platform 250 can conserve processor and/or memory resources by reducing a number of computations required to detect a leak, as described elsewhere herein.

For example, monitoring platform 250 can determine that a moving average pressure loss value, associated with a particular sensor device 220 (e.g., an upstream sensor device 220), satisfies the threshold (e.g., indicative of a leak). In this case, monitoring platform 250 can prevent other moving average pressure loss values (e.g., associated with downstream sensor devices 220) from being compared to the threshold. In this way, monitoring platform 250 can reduce a number of computations associated with leak detection, and conserve processor and/or memory resources.

Alternatively, monitoring platform 250 can perform an initial comparison based on a location of a particular sensor device 220 that is closest to the end-delivery element.

Additionally, monitoring platform 250 can determine that the moving average pressure loss value of the particular sensor device 220 does not satisfy the threshold. In this case, monitoring platform 250 can prevent other comparisons (e.g., associated with upstream sensor devices 220) from being performed. In this way, monitoring platform 250 can conserve processor and/or memory resources.

As further shown in FIG. 6, if the moving average pressure loss value does not satisfy the threshold (block 620—NO), then process 600 can include performing operations of block 610 and block 620 for other locations associated with other sensor devices 220.

As further shown in FIG. 6, if the moving average pressure loss value does satisfy the threshold (block 620—YES), then process 600 can include determining whether a second location is associated with a moving average pressure loss value that satisfies the threshold (block 630). For example, monitoring platform 250 can perform operations of block 610 and block 620 for other locations of the irrigation system. As a particular example, if monitoring platform 250 determines that a particular location is associated with a moving average pressure loss value that satisfies the threshold, then monitoring platform 250 can determine whether moving average pressure loss values, of upstream locations, satisfy the threshold (e.g., because upstream locations can affect downstream locations).

As further shown in FIG. 6, if a second location is associated with a moving average pressure loss value that satisfies the threshold, then process 600 can include comparing the first location and the second location (block 640). For example, if monitoring platform 250 determines that multiple locations are associated with moving average pressure loss values that satisfy the threshold, then monitoring platform 250 can compare the multiple locations to identify a particular location, of the multiple locations, that is closest to a source element, a fluid movement control element, or the like. For example, monitoring platform 250 can determine a location (e.g., an upstream location) that affects other locations (e.g., downstream locations), and/or that is not affected by another location. In this way, monitoring platform 250 can identify a location of a leak (e.g., a leak location), as described below.

As further shown in FIG. 6, if a second location is not associated with a moving average pressure loss value that satisfies the threshold (block 630—NO) or if monitoring platform 250 compared multiple locations that are associated with moving average pressure loss values that satisfy the threshold, then process 600 can include identifying a location of a leak, and providing information that identifies the location of the leak to permit and/or cause an action to be performed (block 650).

In some implementations, monitoring platform 250 can identify a location of a leak (e.g., a leak location) based on determining a single location that is associated with a moving average pressure loss value that satisfies the threshold. Alternatively, monitoring platform 250 can identify a location of a leak based on comparing locations that are associated with moving average pressure loss values that satisfy the threshold. In some implementations, monitoring platform 250 can store and/or access information that identifies sensor devices 220 (e.g., sensor device identifiers, or the like) and indicates locations of sensor devices 220 (e.g., indicates that particular sensor devices 220 are upstream sensor devices 220, are downstream sensor devices 220, indicates a location identifier, indicates a block identifier, indicates a row identifier, indicates proximities of sensor devices 220 to a source element (e.g., pressure source), or the like). Additionally, or alternatively, monitoring platform 250 can identify a location of a leak based on the information that identifies the locations of sensor devices 220 (e.g., can compare respective information that identifies respective locations of sensor devices 220).

In some implementations, monitoring platform 250 can determine a particular sensor device 220 that is associated with a moving average pressure loss value that satisfies the threshold, and that is not affected by an upstream sensor device 220 that is associated with a moving average pressure loss value that satisfies the threshold. Additionally, monitoring platform 250 can determine another sensor device 220 that is adjacent (e.g., upstream) to the particular sensor device 220, and provide information that identifies the sensor devices 220 (e.g., because the leak is likely to be associated with a location between the sensor devices 220). For example, monitoring platform 250 can provide information that identifies a location of sensor devices 220 (e.g., a geographic location, a location of a portion of irrigation system, a location of block(s) and/or row(s) associated with sensor devices 220, or the like).

In some implementations, monitoring platform 250 can permit and/or cause an action to be performed based on identifying the location of the leak. For example, monitoring platform 250 can cause a message (e.g., an email message or a short message service (SMS) message) to be sent to user device 210 based on identifying the location of the leak. In this way, monitoring platform 250 can notify a user (e.g., a farmer) of a location of the leak, thereby reducing a need of the user to utilize other computing devices to attempt to localize the leak, thereby conserving processor and/or memory resources of the other computing devices that can be used to attempt to identify the leak.

In some implementations, monitoring platform 250 can automatically schedule a service to be performed based on identifying the location of the leak. For example, monitoring platform 250 can schedule an entity (e.g., a company, a group of individuals, an individual, an employee, etc.) to perform a service (e.g., repair the irrigation system, or the like). Additionally, or alternatively, monitoring platform 250 can automatically cause an order for materials to be placed based on identifying the location of the leak (e.g., materials associated with repairing the irrigation system, or the like). In this way, monitoring platform 250 can reduce an amount of time associated with the leak, thereby conserving processor and/or memory resources of monitoring platform 250 (e.g., resources allocated towards monitoring the leak and/or providing notifications associated with the leak), preventing crop damage, preventing a waste of water, improving crop yields, etc.

In some implementations, monitoring platform 250 can automatically cause sensor device 220 to perform an action based on identifying the location of the leak. For example, assume that sensor device 220 is associated with a valve (e.g., can inhibit flow of water, herbicide, fertilizer, fungicide, etc. towards a location of the leak). In this case, monitoring platform 250 can provide, to sensor device 220, an instruction that causes sensor device 220 to perform an action (e.g., close a valve, partially close a valve, or the like). In some implementations, monitoring platform 250 can provide, to sensor device 220, an instruction that causes sensor device 220 to adjust a valve (e.g., open, close, partially close, etc.) based on a moving average pressure loss value. As an example, monitoring platform 250 can determine an amount by which the moving average pressure loss value is greater than the threshold, and provide an instruction that causes sensor device 220 to adjust a valve to a particular extent based on the amount by which the moving average pressure loss value is greater than the threshold. In this way, monitoring platform 250 can inhibit water flow toward the leak, can reduce water flow toward the leak, can increase water flow toward the leak, or the like.

In some implementations, monitoring platform 250 can utilize other data (e.g., wind information, humidity information, precipitation information, radiation information, etc.), and automatically cause an action to be performed based on the other data. For example, monitoring platform 250 can prevent a block, a row, etc. from being irrigated based on the other sensor data (e.g., in the event of a rainfall).

In some implementations, monitoring platform 250 can automatically cause farming device 260 to perform an action based on identifying the location of the leak. For example, monitoring platform 250 can cause a UAV to visually inspect a block associated with the leak, can prevent a UAV from spraying a chemical in association with a block associated with the leak, can cause a UAV to irrigate (e.g., spray) particular blocks that can be affected based on the leak (e.g., provided with insufficient irrigation).

In this way, monitoring platform 250 can continuously monitor moving average pressure loss values associated with respective sensor devices 220 that correspond to particular locations of the irrigation system, determine that particular moving average pressure loss values satisfy a threshold, identify a leak location based on the particular locations, and automatically cause an action to be performed based on identifying the leak location. Implementations described herein enable monitoring platform 250 to reduce a number of false positives (e.g., based on determining moving average pressure loss values), thereby conserving processor and/or memory resources of monitoring platform 250, user devices 210, sensor devices 220, and/or farming devices 260, and/or network resources (e.g., by reducing a number of instances where an action is performed based on a false positive).

Although FIG. 6 shows example blocks of process 600, in some implementations, process 600 can include additional blocks, fewer blocks, different blocks, or differently arranged blocks than those depicted in FIG. 6. Additionally, or alternatively, two or more of the blocks of process 600 can be performed in parallel.

Implementations described herein enable a monitoring platform to receive, from hundreds, thousands, etc. of sensor devices, information that identifies respective volumetric flow rates that are measured by the sensor devices, and determine moving average pressure loss values based on the volumetric flow rates. In this way, the monitoring platform can establish baseline moving average pressure loss values, and identify leaks based on deviations from the baseline.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A device, comprising:
one or more processors to:
receive, from a set of sensor devices associated with a set of locations of an irrigation system, information that identifies a set of volumetric flow rates;
determine, based on the set of volumetric flow rates, a set of pressure loss values associated with the set of locations of the irrigation system;
determine, based on the set of pressure loss values and a first set of moving average pressure loss values, a second set of moving average pressure loss values;
determine a threshold pressure loss value based on one or more machine learning techniques applied to previously measured moving average pressure loss values associated with the set of sensor devices;

determine a subset of sensor devices for which corresponding moving average pressure loss values, of the second set of moving average pressure loss values, satisfy the threshold pressure loss value;
determine a subset of locations that correspond to the subset of sensor devices;
identify a leak location, associated with the irrigation system, based on the subset of locations; and
provide information that identifies the leak location to cause an action to be performed in association with the leak location.

2. The device of claim 1, where the one or more processors are further to:
compare a first moving average pressure loss value, of the first set of moving average pressure loss values, and a second moving average pressure loss value of the second set of moving average pressure loss values,
the first moving average pressure loss value and the second moving average pressure loss value being associated with a same sensor device of the subset of sensor devices; and
where the one or more processors, when determining the subset of sensor devices, are to:
determine the subset of sensor devices based on comparing the first moving average pressure loss value and the second moving average pressure loss value.

3. The device of claim 1, where the one or more processors are further to:
provide, to a first sensor device, an instruction to close a valve associated with the irrigation system.

4. The device of claim 1, where the one or more processors are further to:
identify a first location, of the set of locations, of a first sensor device of the subset of sensor devices;
identify a second location, of the set of locations, of a second sensor device of the set of sensor devices;
determine a first proximity, of the first location, to a pressure source associated with the irrigation system;
determine a second proximity, of the second location, to the pressure source; and
where the one or more processors, when identifying the leak location, are to:
identify the leak location based on the first proximity and the second proximity.

5. The device of claim 1, where the one or more processors are further to:
determine a set of intervals associated with the set of volumetric flow rates; and
where the one or more processors, when determining the set of pressure loss values, are to:
determine the set of pressure loss values based on the set of volumetric flow rates and the set of intervals.

6. The device of claim 1, where the one or more processors are further to:
provide, to an unmanned aerial vehicle (UAV), an instruction that causes the UAV to spray an area associated with the leak location.

7. The device of claim 1, where the one or more processors are further to:
identify a set of rows associated with the irrigation system,
the set of rows being associated with the set of sensor devices; and
where the one or more processors, when identifying the leak location, are to:
identify the leak location based on the set of rows.

8. A non-transitory computer-readable medium storing instructions, the instructions comprising:
one or more instructions that, when executed by one or more processors, cause the one or more processors to:
receive, from a set of sensor devices associated with a set of locations, information that identifies a set of volumetric flow rates;
determine, based on the set of volumetric flow rates, a set of pressure loss values associated with the set of locations;
determine, based on the set of pressure loss values and a first set of moving average pressure loss values, a second set of moving average pressure loss values;
determine a threshold pressure loss value based on one or more machine learning techniques applied to previously measured moving average pressure loss values associated with the set of sensor devices;
determine a subset of sensor devices for which corresponding moving average pressure loss values, of the second set of moving average pressure loss values, satisfy the threshold pressure loss value;
determine a subset of locations that correspond to the subset of sensor devices;
identify a leak location based on the subset of locations; and
provide information that identifies the leak location to permit an action to be performed in association with the leak location.

9. The non-transitory computer-readable medium of claim 8, where the one or more instructions, when executed by the one or more processors, further cause the one or more processors to:
determine a first location identifier associated with a first sensor device of the subset of sensor devices;
determine a second location identifier associated with a second sensor device of the subset of sensor devices; and
where the one or more instructions, that cause the one or more processors to identify the leak location, cause the one or more processors to:
identify the leak location based on the first location identifier and the second location identifier.

10. The non-transitory computer-readable medium of claim 8, where the one or more instructions, when executed by the one or more processors, further cause the one or more processors to:
provide, to a user device, information that identifies a geographic location of an area of a field associated with the leak location.

11. The non-transitory computer-readable medium of claim 8, where the one or more instructions, when executed by the one or more processors, further cause the one or more processors to:
provide, to a first sensor device, an instruction that causes the first sensor device to partially close a valve of an irrigation system.

12. The non-transitory computer-readable medium of claim 8, where the one or more instructions, when executed by the one or more processors, further cause the one or more processors to:
determine a first location of a first sensor device of the subset of sensor devices;
determine a second location of a second sensor device of the set of sensor devices;
determine that the second sensor device is upstream of the first sensor device based on the first location and the second location; and where the one or more instructions, that cause the one or more processors to provide the information that identifies the leak location, cause the one or more processors to:
provide the information that identifies the leak location based on the first location and the second location.

13. The non-transitory computer-readable medium of claim 8, where the one or more instructions, when executed by the one or more processors, further cause the one or more processors to:
provide, to a first sensor device, of the set of sensor devices, an instruction that causes the first sensor device to close a valve associated with a fluid transport system,
the leak location being associated with the fluid transport system.

14. The non-transitory computer-readable medium of claim 8, where the set of sensor devices is associated with an irrigation system.

15. A method, comprising:
receiving, by a device and from a set of sensor devices associated with a set of locations of a fluid transport system, information that identifies a set of volumetric flow rates;
determining, by the device and based on the set of volumetric flow rates, a set of pressure loss values associated with the set of locations of the fluid transport system;
determining, by the device and based on the set of pressure loss values and a first set of average pressure loss values, a second set of average pressure loss values;
determining, by the device, a threshold pressure loss value based on one or more machine learning techniques applied to previously measured moving average pressure loss values associated with the set of sensor devices;
determining, by the device and based on the second set of average pressure loss values, a subset of sensor devices for which corresponding average pressure loss values, of the second set of average pressure loss values, satisfy the threshold pressure loss value;
determining, by the device, a subset of locations that correspond to the subset of sensor devices;
identifying, by the device, a leak location based on the subset of locations; and
providing, by the device, information that identifies the leak location to permit an action to be performed in association with the leak location.

16. The method of claim 15, further comprising:
comparing a first average pressure loss value, of the first set of average pressure loss values, and a second average pressure loss value of the second set of average pressure loss values,
the first average pressure loss value and the second average pressure loss value being associated with a same sensor device of the subset of sensor devices; and
where determining the subset of sensor devices comprises:
determining the subset of sensor devices based on comparing the first average pressure loss value and the second average pressure loss value.

17. The method of claim 15, further comprising:
providing, to a first sensor device, of the subset of sensor devices, an instruction that causes the first sensor device to perform the action in association with the fluid transport system,
the action being associated with inhibiting a flow of a fluid of the fluid transport system in association with the leak location.

18. The method of claim 15, further comprising:
receiving information that identifies a first device identifier of a first sensor device of the subset of sensor devices;
receiving information that identifies a second device identifier of a second sensor device of the subset of sensor devices;
comparing the first device identifier and the second device identifier; and
where identifying the leak location comprises:
identifying the leak location based on comparing the first device identifier and the second device identifier.

19. The method of claim 15, where the fluid transport system is an irrigation system.

20. The method of claim 15, further comprising:
providing, to a user device, information that identifies a geographic location of the leak location.

* * * * *